(12) United States Patent
Lee et al.

(10) Patent No.: US 11,775,104 B2
(45) Date of Patent: Oct. 3, 2023

(54) DISPLAY DEVICE AND DRIVING METHOD THEREOF

(71) Applicant: Samsung Display Co., Ltd., Yongin-si (KR)

(72) Inventors: Jeong Heon Lee, Yongin-si (KR); Kyo Won Ku, Yongin-si (KR); Jung Hak Kim, Yongin-si (KR); Jin Woo Kim, Yongin-si (KR); Dong Chun Lee, Yongin-si (KR); Byeong Kyu Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 92 days.

(21) Appl. No.: 17/343,449

(22) Filed: Jun. 9, 2021

(65) Prior Publication Data

US 2022/0147215 A1 May 12, 2022

(30) Foreign Application Priority Data

Nov. 11, 2020 (KR) .................. 10-2020-0150492

(51) Int. Cl.
*G06F 3/041* (2006.01)
(52) U.S. Cl.
CPC ........ *G06F 3/04164* (2019.05); *G06F 3/0412* (2013.01); *G06F 3/04166* (2019.05)

(58) Field of Classification Search
None
See application file for complete search history.

(56) References Cited

U.S. PATENT DOCUMENTS

| 9,652,058 | B2 | 5/2017 | Watanabe | |
|---|---|---|---|---|
| 10,739,909 | B1* | 8/2020 | Lin | G09G 5/003 |
| 2015/0212643 | A1* | 7/2015 | Lee | G06F 3/0446 |
| | | | | 345/174 |
| 2017/0177145 | A1* | 6/2017 | Hara | G06F 3/04162 |
| 2020/0201505 | A1* | 6/2020 | Jung | G06F 3/0414 |
| 2020/0401293 | A1* | 12/2020 | Wang | G06F 3/04162 |
| 2021/0200404 | A1* | 7/2021 | Kim | G06F 3/0412 |
| 2022/0019327 | A1* | 1/2022 | So | G06F 3/04162 |

* cited by examiner

*Primary Examiner* — Krishna P Neupane
(74) *Attorney, Agent, or Firm* — Lewis Roca Rothgerber Christie LLP (57) ABSTRACT

A display device includes: a display unit; and a sensor unit overlapping with the display unit, and including first sensors, and second sensors crossing the first sensors. During a first frame period, the first sensors are to transmit an uplink signal, and the second sensors are to not transmit the uplink signal, and during a second frame period after the first frame period, the second sensors are to transmit the uplink signal, and the first sensors are to not transmit the uplink signal.

18 Claims, 9 Drawing Sheets

DISPLAY DEVICE AND DRIVING METHOD THEREOF

CROSS-REFERENCE TO RELATED APPLICATION

This application claims priority to and the benefit of Korean Patent Application No. 10-2020-0150492, filed on Nov. 11, 2020, the entire disclosure of which is incorporated by reference herein.

BACKGROUND

1. Field

Aspects of embodiments of the present disclosure relate to a display device, and a driving method thereof.

2. Discussion

With the development of information technology, the importance of display devices, which are a connection medium between users and information, has been emphasized. Thus, the uses of the display devices, for example, such as a liquid crystal display device, an organic light emitting display device, and the like, has been increasing.

A display device may include a pixel unit for displaying an image, and a sensing unit for sensing a user input. The sensing unit may be positioned to overlap with the pixel unit.

The user input may be performed not only through a touch, but may also be performed through suitable electronic devices, for example, such as an active pen. In this case, the display device may periodically transmit an uplink signal to communicate with the active pen.

Such an uplink signal may interfere with signals for displaying the image in the display device, and thus, a deterioration of display quality may occur.

The above information disclosed in this Background section is for enhancement of understanding of the background of the present disclosure, and therefore, it may contain information that does not constitute prior art.

SUMMARY

One or more embodiments of the present disclosure are directed to a display device capable of preventing or reducing deterioration in display quality due to transmission of an uplink signal, and a driving method thereof.

According to one or more embodiments of the present disclosure, a display device includes: a display unit; and a sensor unit overlapping with the display unit, and including first sensors, and second sensors crossing the first sensors. During a first frame period, the first sensors are configured to transmit an uplink signal, and the second sensors are configured to not transmit the uplink signal, and during a second frame period after the first frame period, the second sensors are configured to transmit the uplink signal, and the first sensors are configured to not transmit the uplink signal.

In an embodiment, during a first object sensing period of the first frame period, the first sensors may be configured to concurrently transmit the uplink signal, and during a first object sensing period of the second frame period, the second sensors may be configured to concurrently transmit the uplink signal.

In an embodiment, during a second object sensing period of the first frame period, the first sensors may be configured to sequentially transmit sensing signals, and the second sensors may be configured to receive sampling signals corresponding to the sensing signals, and during a second object sensing period of the second frame period, the first sensors may be configured to sequentially transmit the sensing signals, and the second sensors may be configured to receive the sampling signals.

In an embodiment, the display device may further include: a first object configured to transmit a first downlink signal during a corresponding frame period in response to receiving the uplink signal.

In an embodiment, the first object may be configured to transmit a second downlink signal during a next frame period in response to receiving the uplink signal during the corresponding frame period.

In an embodiment, the first object may be configured to transmit the second downlink signal even when the uplink signal is not received during the next frame period.

In an embodiment, the first downlink signal may include an acknowledgment signal, a position signal, and a data signal.

In an embodiment, at least some of the first sensors and at least some of the second sensors may be configured to receive the position signal.

In an embodiment, during a third frame period after the second frame period, the first sensors may be configured to transmit the uplink signal, and the second sensors may be configured to not transmit the uplink signal, and during a fourth frame period after the third frame period, the second sensors may be configured to transmit the uplink signal, and the first sensors may be configured to not transmit the uplink signal.

In an embodiment, during a third frame period after the second frame period, the second sensors may be configured to transmit the uplink signal, and the first sensors may be configured to not transmit the uplink signal, and during a fourth frame period after the third frame period, the first sensors may be configured to transmit the uplink signal, and the second sensors may be configured to not transmit the uplink signal.

According to one or more embodiments of the present disclosure, a driving method of a display device including a display unit, and first sensors and second sensors overlapping with the display unit and crossing each other, includes: during a first frame period, transmitting an uplink signal by the first sensors, and not transmitting the uplink signal by the second sensors; and during a second frame period after the first frame period, transmitting the uplink signal by the second sensors, and not transmitting the uplink signal by the first sensors.

In an embodiment, the driving method may further include: concurrently transmitting the uplink signal by the first sensors during a first object sensing period of the first frame period, and concurrently transmitting the uplink signal by the second sensors during a first object sensing period of the second frame period.

In an embodiment, the driving method may further include: during a second object sensing period of the first frame period, sequentially transmitting sensing signals by the first sensors, and receiving sampling signals corresponding to the sensing signals by the second sensors; and during a second object sensing period of the second frame period, sequentially transmitting the sensing signals by the first sensors, and receiving the sampling signals by the second sensors.

In an embodiment, the driving method may further include: transmitting a first downlink signal during a corresponding frame period by a first object in response to the first object receiving the uplink signal.

In an embodiment, the driving method may further include: transmitting a second downlink signal during a next frame period by the first object in response to the first object receiving the uplink signal during the corresponding frame period.

In an embodiment, the first object may transmit the second downlink signal even when the uplink signal is not received during the next frame period.

In an embodiment, the first downlink signal may include an acknowledgment signal, a position signal, and a data signal.

In an embodiment, the driving method may further include: receiving the position signal by at least some of the first sensors and at least some of the second sensors.

In an embodiment, the driving method may further include: during a third frame period after the second frame period, transmitting the uplink signal by the first sensors, and not transmitting the uplink signal by the second sensors; and during a fourth frame period after the third frame period, transmitting the uplink signal by the second sensors, and not transmitting the uplink signal by the first sensors.

In an embodiment, the driving method may further include: during a third frame period after the second frame period, transmitting the uplink signal by the second sensors, and not transmitting the uplink signal by the first sensors; and during a fourth frame period after the third frame period, transmitting the uplink signal by the first sensors, and not transmitting the uplink signal by the second sensors.

BRIEF DESCRIPTION OF THE DRAWINGS

The above and other aspects and features of the present disclosure will be more clearly understood from the following detailed description of the illustrative, non-limiting example embodiments with reference to the accompanying drawings.

DETAILED DESCRIPTION

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Similarly, the expression "the same as" as used herein may include "substantially the same as" to account for variations in manufacturing processes, measurements, calculated values and the like as would be understood by those having ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary," if any, is intended to refer to an example or illustration.

The electronic or electric devices and/or any other relevant devices or components (e.g., the sensor driver, the display driver, and the like) according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
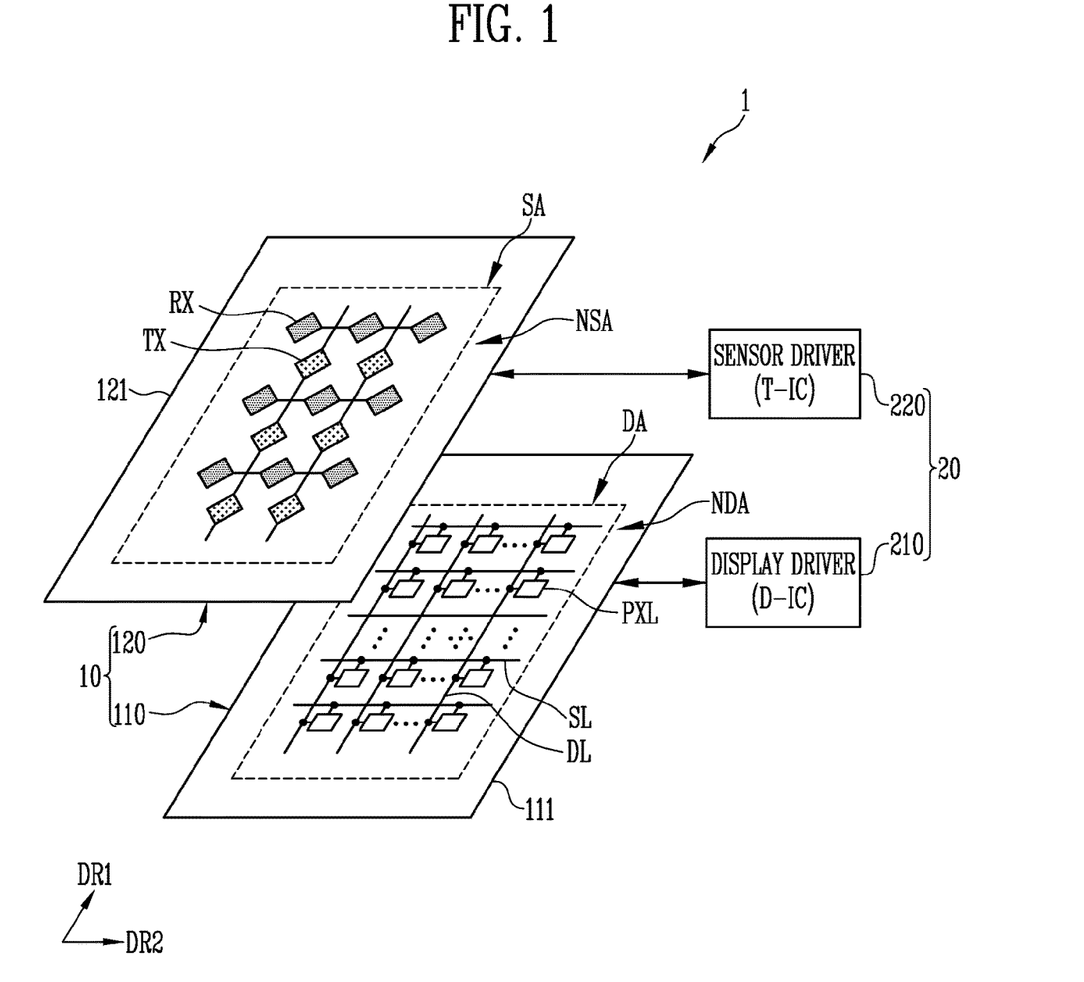
FIG. 1 is a diagram illustrating a display device according to an embodiment of the present disclosure.

FIG. 1 is a diagram illustrating a display device according to an embodiment of the present disclosure.

Referring to FIG. 1, a display device 1 according to an embodiment of the present disclosure may include a panel 10, and a driving circuit unit (e.g., a driving circuit) 20 for driving the panel 10.

For example, the panel 10 may include a display unit (e.g., a display panel or a display layer) 110 for displaying an image, and a sensor unit (e.g., a sensor panel or a sensor layer) 120 for sensing a touch, pressure, a fingerprint, hovering (e.g., a proximity), an active pen, and/or the like. The sensor unit 120 may be positioned to overlap with the display unit 110. For example, the panel 10 may include pixels PXL, and first sensors TX and second sensors RX positioned to overlap with at least some of the pixels PXL. The driving circuit unit 20 may include a display driver 210 for driving the display unit 110, and a sensor driver 220 for driving the sensor unit 120.

According to an embodiment, the display unit 110 and the sensor unit 120 may be manufactured separately from each other, and may then be disposed on and/or combined with one another so that at least one area of each of the display unit 110 and the sensor unit 120 overlaps with each other. As another example, in another embodiment, the display unit 110 and the sensor unit 120 may be integrally manufactured with each other. For example, the sensor unit 120 may be directly formed on at least one substrate constituting the display unit 110 (for example, an upper and/or lower substrate of the display panel, or a thin film encapsulation layer), or on other insulating layers or various functional layers (for example, an optical layer or a protective layer).

While in FIG. 1, the sensor unit 120 is shown as being disposed on a front side (e.g., a front surface or top surface) of the display unit 110 (for example, an upper surface at (e.g., in or on) which an image is displayed), the position of the sensor unit 120 is not limited thereto. For example, in another embodiment, the sensor unit 120 may be disposed on the rear side (e.g., a rear surface or a bottom surface) or both sides (e.g., both surfaces) of the display unit 110. In another embodiment, the sensor unit 120 may be disposed on at least one edge area of the display unit 110.

The display unit 110 may include a display substrate 111, and a plurality of the pixels PXL formed on the display substrate 111. The pixels PXL may be disposed at (e.g., in or on) a display area DA of the display substrate 111.

The display substrate 111 may include the display area DA at (e.g., in or on) which an image is displayed, and a non-display area NDA outside the display area DA. According to an embodiment, the display area DA may be disposed at (e.g., in or on) a central area of the display unit 110, and the non-display area NDA may be disposed at (e.g., in or on) an edge area of the display unit 110 to surround (e.g., around a periphery of) the display area DA.

The display substrate 111 may be a rigid substrate or a flexible substrate, but the material and physical properties of the display substrate 111 are not particularly limited. For example, the display substrate 111 may be a rigid substrate including (e.g., made of) glass or tempered glass, or a flexible substrate including (e.g., made of) a thin film including a plastic or a metal.

Scan lines SL, data lines DL, and the pixels PXL connected to the scan lines SL and the data lines DL may be disposed at (e.g., in or on) the display area DA. The pixels PXL may be selected by a scan signal of a turn-on level supplied from the scan lines SL to receive a data voltage from the data lines DL, and may emit light having a desired luminance corresponding to the data voltage. Accordingly, an image corresponding to the data voltage may be displayed at (e.g., in or on) the display area DA. In the present disclosure, the structure and driving method of the pixels PXL are not particularly limited. For example, each of the pixels PXL may be implemented as a pixel having various suitable structures and/or driving methods as would be known to those having ordinary skill in the art.

Various wirings and/or built-in circuit units connected to the pixels PXL of the display area DA may be disposed at (e.g., in or on) the non-display area NDA. For example, a plurality of wirings for supplying various power sources and control signals to the display area DA may be disposed at (e.g., in or on) the non-display area NDA. In addition, a scan driver and the like may be disposed at (e.g., in or on) the non-display area NDA.

In the present disclosure, the type of the display unit 110 is not particularly limited. For example, the display unit 110 may be implemented as a self-light emitting kind of display panel, for example, such as an organic light emitting display panel. As another example, the display unit 110 may be implemented as a non-light emitting kind of display panel, for example, such as a liquid crystal display panel. When the display unit 110 is implemented as the non-light emitting type, the display device 1 may further include a light source, for example, such as a back-light unit (e.g., a back-light panel).

The sensor unit 120 may include a sensor substrate 121, and a plurality of sensors TX and RX formed on the sensor substrate 121. The sensors TX and RX may be disposed at (e.g., in or on) a sensing area SA of the sensor substrate 121.

The sensor substrate 121 may include the sensing area SA to sense a touch input (e.g., a touch event) and/or the like, and a peripheral area NSA outside the sensing area SA. According to an embodiment, the sensing area SA may be disposed to overlap with at least one area of the display area DA. For example, the sensing area SA may be an area corresponding to the display area DA (for example, an area overlapping with the display area DA), and the peripheral area NSA may be an area corresponding to the non-display area NDA (for example, an area overlapping with the non-display area NDA). In this case, when the touch input or the like is provided on the display area DA, the touch input may be detected through the sensor unit 120.

The sensor substrate 121 may be a rigid substrate or a flexible substrate, and may include (e.g., may be formed of) at least one insulating layer. Further, the sensor substrate 121 may be a transparent or translucent light-transmitting substrate, but the present disclosure is not limited thereto. In other words, in the present disclosure, the material and physical properties of the sensor substrate 121 are not particularly limited. For example, the sensor substrate 121 may be a rigid substrate including (e.g., made of) glass or tempered glass, or a flexible substrate including (e.g., made of) a thin film including a plastic or a metal. In addition, according to an embodiment, at least one substrate constituting the display unit 110 (for example, the display substrate 111, an encapsulation substrate, and/or a thin film encapsulation layer), or at least one insulating layer or functional layer disposed on inner and/or outer surfaces of the display unit 110 may be used as the sensor substrate 121.

The sensing area SA may be an area (e.g., an active area of a sensor) capable of responding to the user input. As such, the sensors TX and RX for sensing the user input and/or the like may be disposed at (e.g., in or on) the sensing area SA. According to an embodiment, the sensors TX and RX may include the first sensors TX and the second sensors RX. The first sensors TX and the second sensors RX may cross each other.

For example, each of the first sensors TX may extend in a first direction DR1. The first sensors TX may be arranged along a second direction DR2. The second direction DR2 may be different from the first direction DR1. For example, the second direction DR2 may be a direction orthogonal to or substantially orthogonal to the first direction DR1. In another embodiment, the extension direction and the arrangement direction of the first sensors TX may follow other suitable configurations. Each of the first sensors TX may have a form in which first cells having a relatively large area and first bridges having a relatively narrow area are connected to one another. In FIG. 1, each of the first cells is shown as having a diamond shape (e.g., in a plan view), but the present disclosure is not limited thereto, and each of the first cells may have various suitable shapes, for example, such as a circle shape, a square shape, a triangle shape, and/or a mesh shape. For example, the first bridges may be integrally formed at (e.g., in or on) the same layer as that of the first cells. In another embodiment, the first bridges may be formed at (e.g., in or on) a layer different from that of the first cells to electrically connect adjacent first cells to each other.

For example, each of the second sensors RX may extend in the second direction DR2. The second sensors RX may be arranged along the first direction DR1. In another embodiment, the extension direction and the arrangement direction of the second sensors RX may follow other suitable configurations. Each of the second sensors RX may have a form in which second cells having a relatively large area and second bridges having a relatively narrow area are connected to one another. In FIG. 1, each of the second cells is shown as having a diamond shape (e.g., in a plan view), but may have various suitable shapes, for example, such as a circle shape, a square shape, a triangle shape, and/or a mesh shape. For example, the second bridges may be integrally formed at (e.g., in or on) the same layer as that of the second cells. In another embodiment, the second bridges may be formed at (e.g., in or on) a layer different from that of the second cells to electrically connect adjacent second cells to each other.

According to an embodiment, each of the first sensors TX and the second sensors RX may have a conductivity by including at least one of a metal material, a transparent conductive material, and/or various other suitable conductive materials. For example, the first sensors TX and the second sensors RX may include at least one of various suitable metal materials, for example, such as gold (Au), silver (Ag), aluminum (Al), molybdenum (Mo), chromium (Cr), titanium (Ti), nickel (Ni), neodymium (Nd), copper (Cu), platinum (Pt), and/or an alloy thereof. In this case, the first sensors TX and the second sensors RX may have a mesh shape. In addition, the first sensors TX and the second sensors RX may include at least one of various suitable transparent conductive materials, for example, such as silver nanowires (AgNW), ITO (Indium Tin Oxide), IZO (Indium Zinc Oxide), IGZO (Indium Gallium Zinc Oxide), AZO (Antimony Zinc Oxide), ITZO (Indium Tin Zinc Oxide), ZnO (Zinc Oxide), $SnO_2$ (Tin Oxide), carbon nano tube, graphene, and/or the like. In addition, the first sensors TX and the second sensors RX may have a conductivity by including at least one of various suitable conductive materials. In addition, each of the first sensors TX and the second sensors RX may be formed of a single layer or multiple layers, and the structure of a cross section thereof is not particularly limited.

Sensor lines for electrically connecting the sensors TX and RX to the sensor driver 220 or the like may be disposed (e.g., intensively disposed) at (e.g., in or on) the peripheral area NSA of the sensor unit 120.

The driving circuit unit 20 may include the display driver 210 for driving the display unit 110, and the sensor driver 220 for driving the sensor unit 120. In an embodiment, the display driver 210 and the sensor driver 220 may be formed of separate integrated circuit chips (ICs). In another embodiment, at least a portion of the display driver 210 and the sensor driver 220 may be integrated together in one IC.

The display driver 210 may be electrically connected to the display unit 110 to drive the pixels PXL. For example, the display driver 210 may include a data driver 12 and a timing controller 11, and a scan driver 13 may be separately mounted at (e.g., in or on) the non-display area NDA of the display unit 110 (e.g., see FIG. 2). In another embodiment, the display driver 210 may include all of or at least a portion of the data driver 12, the timing controller 11, and the scan driver 13.

The sensor driver 220 may be electrically connected to the sensor unit 120 to drive the sensor unit 120. The sensor driver 220 may include a sensor transmitter and a sensor receiver. According to an embodiment, the sensor transmitter and the sensor receiver may be integrated into one IC, but the present disclosure is not limited thereto.

Figure 2:
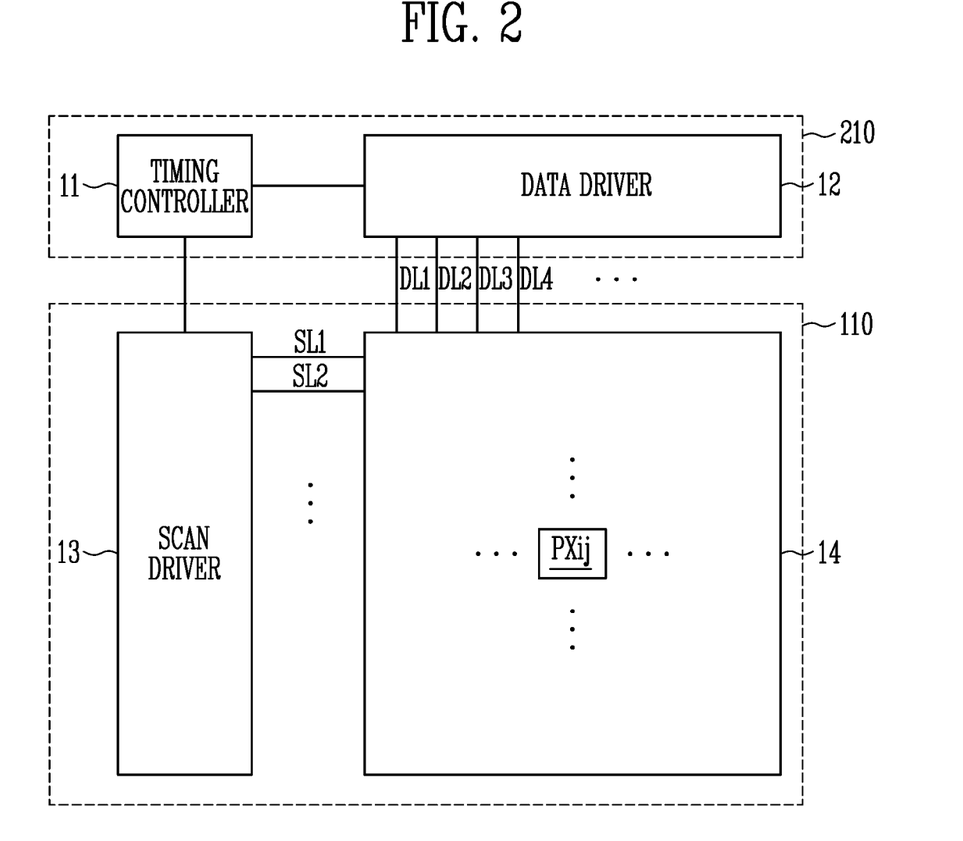
FIG. 2 is a diagram illustrating a display unit and a display driver according to an embodiment of the present disclosure.

FIG. 2 is a diagram illustrating the display unit 110 and the display driver 12 according to an embodiment of the present disclosure.

Referring to FIG. 2, the display driver 210 may include the data driver 12 and the timing controller 11, and the display unit 110 may include the scan driver 13. However, as described above, whether each functional unit is to be integrated into one IC, a plurality of ICs, or mounted on the display substrate 111 may be variously modified according to the specifications of the display device 1.

The timing controller 11 may receive grayscales (e.g., grayscale values or gray values) and control signals for each frame from a processor. Here, the processor may correspond to a graphics processing unit (GPU), a central processing unit (CPU), an application processor (AP), or the like. The control signals may include a vertical synchronization signal, a horizontal synchronization signal, a data enable signal, and the like.

Each cycle of the vertical synchronization signal may correspond to each display frame period. For example, the vertical synchronization signal may indicate an active period of a corresponding display frame period at a logic high level, and may indicate a blank period of the corresponding display frame period at a logic low level. Each cycle of the horizontal synchronization signal may correspond to each horizontal period. The data enable signal may be at an enable level (for example, a logic high level) while the grayscales are supplied from the processor, and may be at a disable level (for example, a logic low level) while the grayscales are not supplied.

The timing controller 11 may render the grayscales to correspond to the specifications of the display device 1. For example, the processor may provide a red grayscale (e.g., a red grayscale value or a red gray value), a green grayscale (e.g., a green grayscale value or a green gray value), and a blue grayscale (e.g., a blue grayscale value or a blue gray value) for each unit dot. For example, when a pixel unit (e.g., a pixel area) 14 has an RGB stripe structure, the pixels PX may correspond to each grayscale (e.g., to each grayscale value or each gray value) in a one-to-one basis. In this case, rendering of the grayscales may be unnecessary. However, for example, when the pixel unit 14 has an RGBG structure or an RGBG matrix structure (e.g., a PENTILE® structure or a PENTILE® matrix structure, PENTILE® being a duly registered trademark of Samsung Display Co., Ltd.), the pixels PX may not correspond to each grayscale in a one-to-one basis, because adjacent unit dots may share pixels with each other. In this case, rendering of the grayscales may be desired or necessary. The grayscales that are rendered or not rendered may be provided to the data driver 12. In addition, the timing controller 11 may provide a data control signal to the data driver 12. Also, the timing controller 11 may provide a scan control signal to the scan driver 13.

The data driver 12 may generate data voltages to be provided to data lines DL1, DL2, DL3, and DL4 using the grayscales and the data control signal received from the timing controller 11.

The scan driver 13 may generate scan signals to be provided to scan lines SL1 and SL2 using a clock signal and a scan start signal received from the timing controller 11. The scan driver 13 may sequentially supply the scan signals having a turn-on level pulse to the scan lines SL1 and SL2. For example, the scan driver 13 may supply the scan signals having the turn-on level to the scan lines at a cycle corresponding to the cycle of the horizontal synchronization signal. The scan driver 13 may include scan stages configured in the form of a shift register. The scan driver 13 may generate the scan signals by sequentially transferring the scan start signal in the form of a turn-on level pulse to a next scan stage under control of the clock signal.

The pixel unit 14 may include the pixels PX. Each of the pixels PX may be connected to a corresponding data line and a corresponding scan line. For example, a pixel PXij may be connected to an i-th scan line and a j-th data line, i and j being natural numbers. The pixels may include pixels PX that emit light of a first color, pixels PX that emit light of a second color, and pixels PX that emit light of a third color. The first color, the second color, and the third color may be different colors from each other. For example, the first color may be one of a red color, a green color, or a blue color, the second color may be one of the red color, the green color, or the blue color that is different from the first color, and the third color may be one of the red color, the green color, or the blue color that is different from the first color and the second color. In addition, magenta, cyan, and yellow may be used instead of red, green, and blue as the first to third colors. However, in the present embodiment, for convenience of description, a case in which the first color, the second color, and the third color are the red color, the green color, and the blue color, respectively, will be described in more detail as an example.

Figure 3:
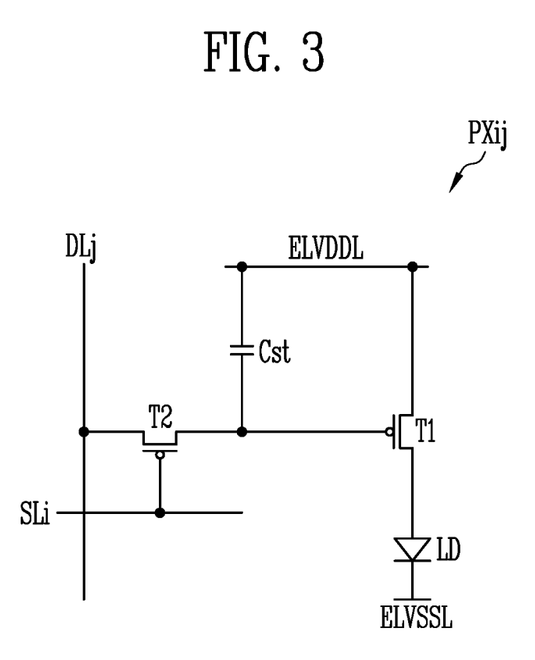
FIG. 3 is a diagram illustrating a pixel according to an embodiment of the present disclosure.

FIG. 3 is a diagram illustrating a pixel according to an embodiment of the present disclosure.

Referring to FIG. 3, the pixel PXij is shown as an example. Because the other pixels PX may have the same or substantially the same structure and configuration as that of the pixel PXij shown in FIG. 3, redundant description thereof may not be repeated.

A transistor (e.g., a first transistor) T1 may have a gate electrode connected to a second electrode of a storage capacitor Cst, a first electrode connected to a first power source line ELVDDL, and a second electrode connected to an anode of a light emitting diode LD. The transistor T1 may be referred to as a driving transistor.

A transistor (e.g., a second transistor) T2 may have a gate electrode connected to an i-th scan line SLi, a first electrode connected to a j-th data line DLj, and a second electrode connected to the second electrode of the storage capacitor Cst. The transistor T2 may be referred to as a scan transistor.

A first electrode of the storage capacitor Cst may be connected to the first power source line ELVDDL, and the second electrode may be connected to the gate electrode of the transistor T1.

The light emitting diode LD may have the anode connected to the second electrode of the transistor T1, and a cathode connected to a second power source line ELVSSL. During an emission period of the light emitting diode LD, a first power source voltage applied to the first power source line ELVDDL may be greater than a second power source voltage applied to the second power source line ELVSSL.

Here, the transistors T1 and T2 are shown as P-type transistors, but the present disclosure is not limited thereto, and as would be understood to those skilled in the art, at least one of the transistors T1 and/or T2 may be modified as an N-type transistor by inverting the polarity of a signal.

When a scan signal having a turn-on level is applied to the i-th scan line SLi, the transistor T2 may be turned on. In this case, a data voltage charged in the j-th data line DLj may be stored in the second electrode of the storage capacitor Cst. The transistor T1 may provide (e.g., may allow the flow of) a driving current in response to a gate-source voltage difference maintained or substantially maintained by the storage capacitor Cst. The driving current may flow through a path passing through the first power source line ELVDDL, the transistor T1, the light emitting diode LD, and the second power source line ELVSSL. The light emitting diode LD may emit light having a desired luminance corresponding to the amount of the driving current.

Figure 4:
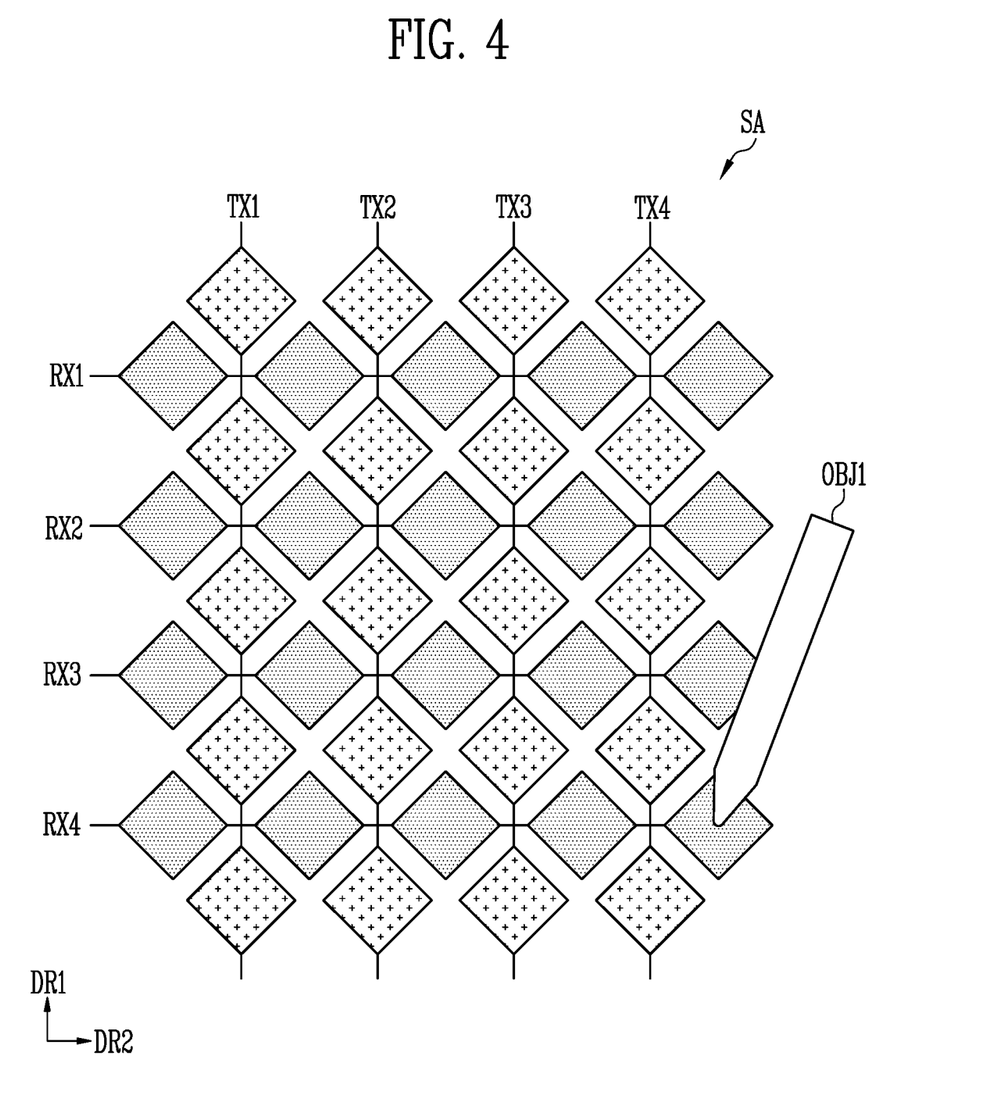
FIG. 4 is a diagram illustrating first sensors and second sensors according to an embodiment of the present disclosure.

FIG. 4 is a diagram illustrating first sensors and second sensors according to an embodiment of the present disclosure.

Referring to FIG. 4, first sensors TX1, TX2, TX3, and TX4 and second sensors RX1, RX2, RX3, and RX4 positioned at (e.g., in or on) the sensing area SA are shown as an example. For convenience of illustration and description, an embodiment in which four first sensors TX1 to TX4 and four second sensors RX1 to RX4 are disposed at (e.g., in or on) the sensing area SA will be described in more detail as an example.

Because the description of the first sensors TX1 to TX4 and the second sensors RX1 to RX4 may be the same or substantially the same as those of the first sensors TX and the second sensors RX described above with reference to FIG. 1, redundant description thereof may not be repeated.

A first object OBJ1 may be an active device that transmits and receives an electromagnetic signal to and from the sensor unit 120. For example, the first object OBJ1 may be an active pen. In an embodiment, the display device 1 may include the first object OBJ1 to be detachable. In another embodiment, the display device 1 and the first object OBJ1 may be separate products from each other.

For example, the sensitivity of the signal transmitted/received by the first object OBJ1 may vary depending on the capacitance formed by a tip of the first object OBJ1 and the sensors TX and RX. FIG. 4 shows a case where the second sensor RX4 is closest to the tip of the first object OBJ1 to form the largest capacitance. Hereinafter, for convenience of description, the following description assumes that the first object OBJ1 may receive an uplink signal from the second sensor RX4 (or has high reception sensitivity), and may not receive the uplink signal from the other sensors TX1, TX2, TX3, TX4, RX1, RX2, and RX3 (or has low reception sensitivity).

Figure 5:
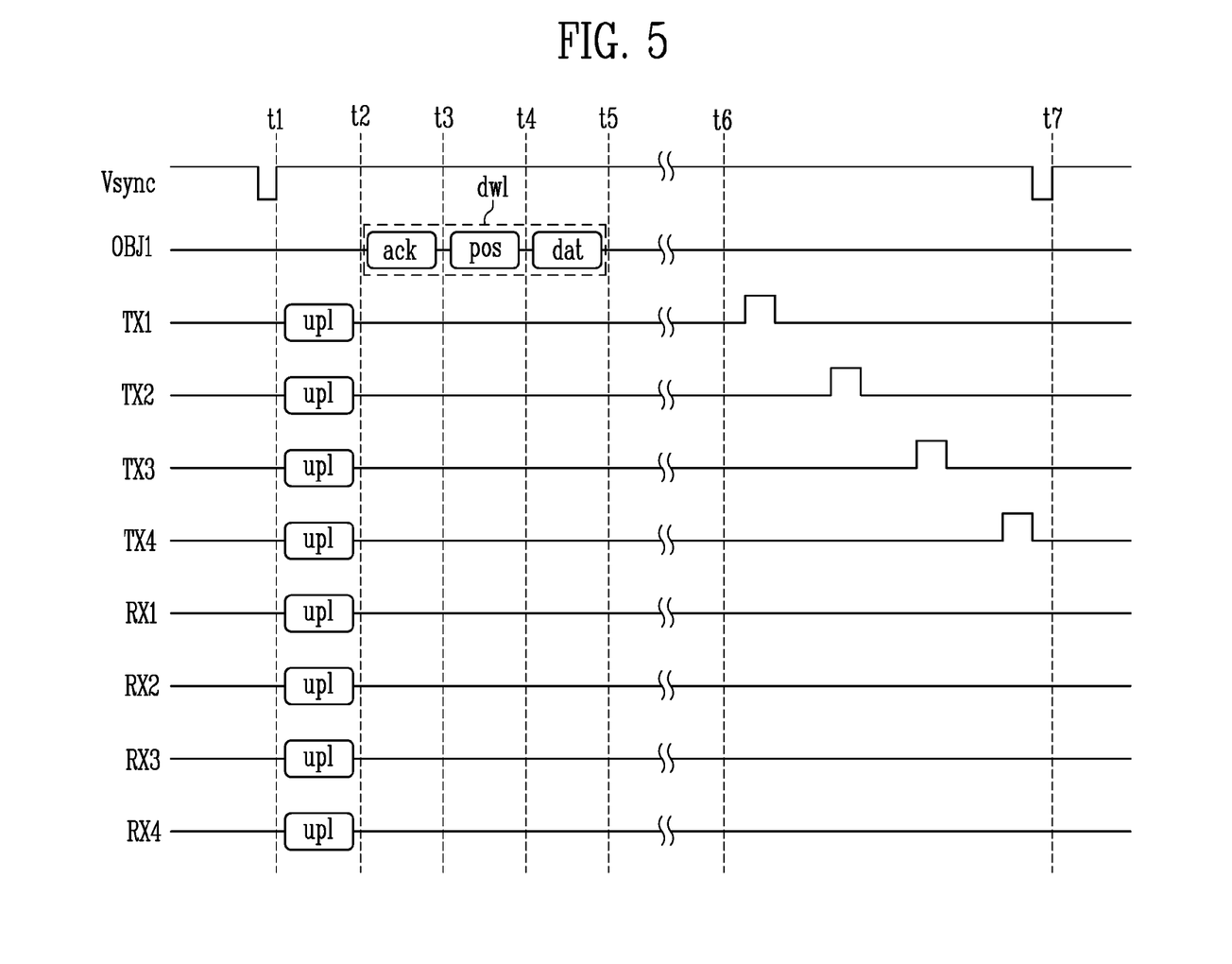
FIGS. 5-7 are diagrams illustrating a first object sensing period and a second object sensing period according to one or more embodiments of the present disclosure.
Figure 6:
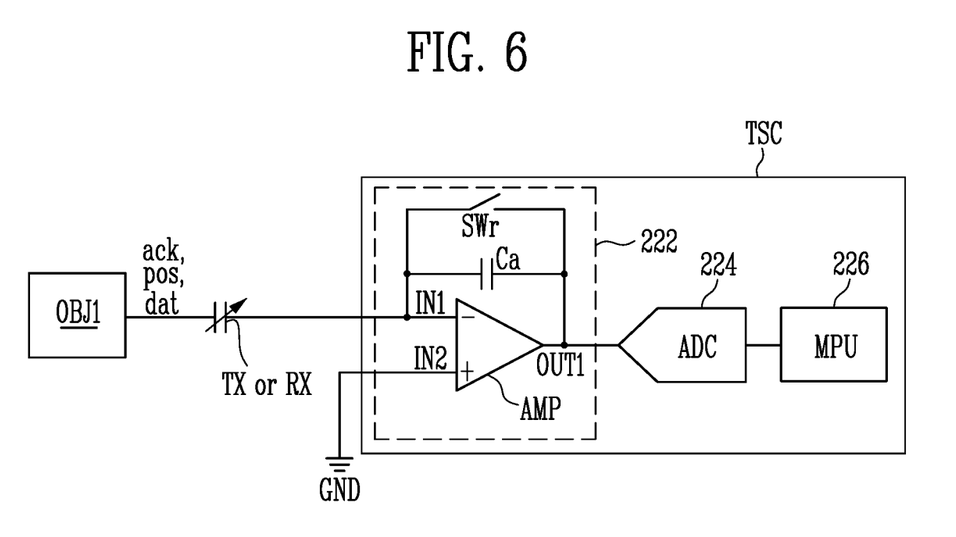
Figure 7:
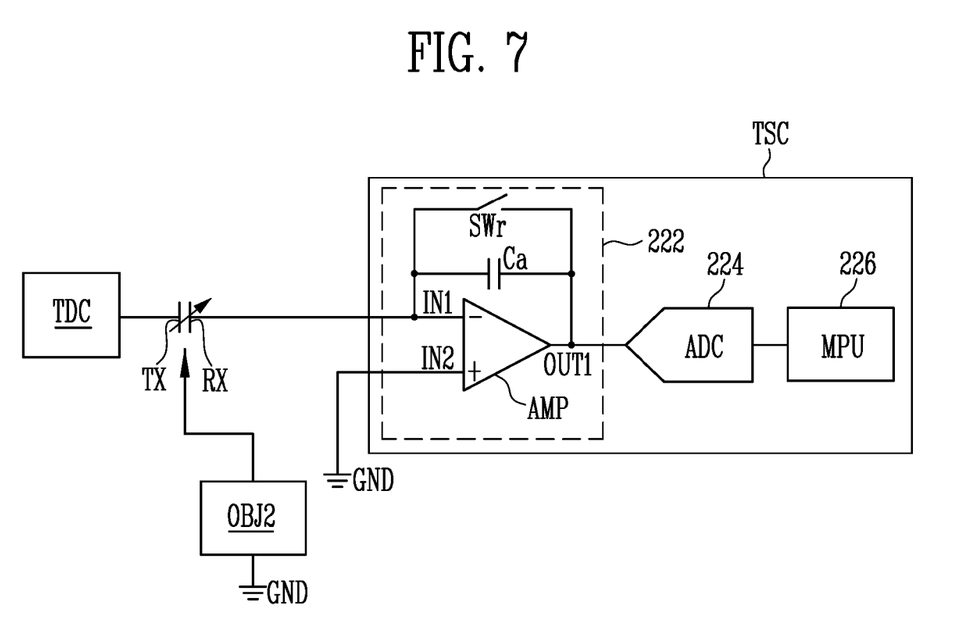

FIGS. 5 to 7 are diagrams illustrating a first object sensing period and a second object sensing period according to an embodiment of the present disclosure.

In FIG. 5, for convenience of illustration, the vertical synchronization signal Vysnc, the first object OBJ1, and the signals of the sensors TX1 to TX4 and RX1 to RX4 are partially shown, and other portions thereof are not shown. In other words, in FIG. 5, portions shown with a straight line in the signals may not have a voltage level fluctuation, or may have the voltage level fluctuation due to, for example, noise or a received signal.

Referring to FIG. 5, one frame period t1 to t7 corresponding to one cycle of the vertical synchronization signal Vsync is shown as an example. Here, the frame period may correspond to a unit of an image display of the display unit 110 (or in other words, a display frame period).

For example, one frame period t1 to t7 may include a first object sensing period t1 to t5 and a second object sensing period t6 to t7. Because the signals for displaying an image at (e.g., in or on) the display unit 110 are generated throughout the one frame period t1 to t7, the signals may overlap with the first object sensing period t1 to t5 and the second object sensing period t6 to t7.

In another embodiment, the frame period t1 to t7 for display may be irrelevant to the first object sensing period t1 to t5 and the second object sensing period t6 to t7. For example, one frame period t1 to t7 may overlap with a plurality of first object sensing periods and a plurality of second object sensing periods. In another embodiment, one frame period t1 to t7 may not be synchronized with the first object sensing period t1 to t5 and the second object sensing period t6 to t7.

The first object sensing period t1 to t5 may be a period for sensing the first object OBJ1.

First, during a period t1 to t2, the first sensors TX1, TX2, TX3, and TX4 and the second sensors RX1, RX2, RX3, and RX4 may transmit an uplink signal upl. For example, the first sensors TX1 to TX4 and the second sensors RX1 to RX4 may concurrently (e.g., may simultaneously) transmit the uplink signal upl. Accordingly, a case in which the first object OBJ1 positioned on the sensor unit 120 does not receive the uplink signal upl may not occur.

The uplink signal upl may interfere with the data voltage through the cathode electrode of the light emitting diode LD of the pixel PXij. As a result, an inappropriate data voltage may be stored in a corresponding pixel PXij, and display quality may be deteriorated. As shown in FIG. 5, when all the sensors TX1 to TX4 and RX1 to RX4 concurrently (e.g., simultaneously) transmit the uplink signal upl during the period t1 to t2, interference caused by the uplink signal upl may be increased or maximized.

According to an embodiment, in order to reduce a channel configuration cost and power consumption, during the period t1 to t2 of each frame period, only the first sensors TX1 to TX4 may transmit the uplink signal upl, or only the second sensors RX1 to RX4 may transmit the uplink signal upl. In this case, the interference caused by the uplink signal upl may be reduced, but a dead zone in which the uplink signal upl is not received may occur depending on the position of the first object OBJ1 on the sensor unit 120.

When the first object OBJ1 receives the uplink signal upl, the first object OBJ1 may transmit a downlink signal dwl during a corresponding frame period t1 to t7. The downlink signal dwl may be variously configured according to a protocol. For example, in the Universal Stylus Initiative (USI) protocol, the downlink signal dwl may include an acknowledgment signal ack, a position signal pos, and a data signal dat. As another example, in the Active Electrostatic Solution (AES) protocol, the downlink signal dwl may include the position signal pos and the data signal dat. In addition, the downlink signal dwl may be defined by various suitable protocols.

The first object OBJ1 may transmit the acknowledgment signal ack during a period t2 to t3. The acknowledgment signal ack may be a signal for notifying that the first object OBJ1 is positioned near the sensor unit 120.

Also, the first object OBJ1 may sequentially transmit the position signal pos and the data signal dat. For example, the first object OBJ1 may transmit the position signal pos during a period t3 to t4, and may transmit the data signal dat during a period t4 to t5. The position signal pos may be a signal for specifying the position of the first object OBJ1 on the sensor unit 120. For example, the position signal pos may have a stronger signal strength than the acknowledgment signal ack, or may include more pulses than that of the acknowledgment signal ack. The data signal dat may be a signal including information (for example, a button press, pressure, and/or the like) other than the position of the first object OBJ1.

Each of the period t1 to t2 for transmitting the uplink signal upl, the period t2 to t3 for transmitting the acknowledgment signal ack, the period t3 to t4 for transmitting the position signal pos, and the period t4 to t5 for transmitting the data signal dat may constitute a time slot. The time slot may be a unit of time (e.g., a time unit) prescribed for communications between the first object OBJ1 and the sensor unit 120.

Referring to FIG. 6, an example configuration of the sensor driver 220 for receiving the signals ack, pos, and dat transmitted from the first object OBJ1 is shown. FIG. 6 shows the configuration of the sensor unit 120 and the sensor driver 220 based on any one sensor channel 222.

The sensor driver 220 may include a sensor receiver TSC. During the first object sensing period t1 to t5, the sensor receiver TSC may be connected to the first sensors TX or the second sensors RX.

The sensor receiver TSC may include an operational amplifier AMP, an analog-to-digital converter 224, and a processor 226. For example, each sensor channel 222 may be implemented as an analog front end (AFE) including at least one operational amplifier AMP. The analog-to-digital converter 224 and the processor 226 may be provided for each sensor channel 222, or may be shared by a plurality of sensor channels 222.

The operational amplifier AMP may have a first input terminal IN1 connected to a corresponding sensor TX or RX, and a second input terminal IN2 connected to a reference power source GND. For example, the first input terminal IN1 may be an inverting terminal, and the second input terminal IN2 may be a non-inverting terminal. The reference power source GND may be a ground voltage, or a voltage having a suitable magnitude (e.g., a predetermined or specific magnitude).

According to an embodiment, the sensor channel 222 may be implemented as an integrator. In this case, a capacitor Ca and a switch SWr may be connected in parallel between the first input terminal IN1 and an output terminal OUT1 of the operational amplifier AMP. For example, charges in the capacitor Ca may be initialized by turning on the switch SWr before receiving the signals ack, pos, and dat transmitted from the first object OBJ1. While receiving the signals ack, pos, and dat transmitted from the first object OBJ1, the switch SWr may be in a turned-off state.

The sensor channel 222 may generate an output signal corresponding to a voltage difference between the first and second input terminals IN1 and IN2. For example, the sensor channel 222 may amplify and output the voltage difference between the first and second input terminals IN1 and IN2 to a degree corresponding to a suitable gain (e.g., a predetermined gain).

The analog-to-digital converter 224 may be connected to the output terminal OUT1 of the operational amplifier AMP. The analog-to-digital converter 224 may convert an analog signal input from each of the sensor channels 222 into a digital signal. The processor 226 may analyze such a digital signal to detect the user input.

During the period t2 to t3, at least some of the sensors TX and/or RX may receive the acknowledgment signal ack for the uplink signal upl. In an embodiment, in order to reduce a channel configuration cost and power consumption, only the first sensors TX may be connected to the sensor channels 222 to receive the acknowledgment signal ack. In another embodiment, in order to reduce a channel configuration cost and power consumption, only the second sensors RX may be connected to the sensor channels 222 to receive the acknowledgment signal ack. In still another embodiment, at least some of the first sensors TX and at least some of the second sensors RX may be connected to the sensor channels 222 to receive the acknowledgment signal ack.

During the period t3 to t4, at least some of the sensors TX and/or RX may receive the position signal pos. For example, at least some of the first sensors TX and at least some of the second sensors RX may receive the position signal pos. Referring again to FIG. 4, the position of the first object OBJ1 in the second direction DR2 may be detected using the sensor channels 222 connected to the first sensors TX1 to TX4. In addition, the position of the first object OBJ1 in the first direction DR1 may be detected using the sensor channels 222 connected to the second sensors RX1 to RX4. In an embodiment, when the number of sensor channels 222 is sufficient, positions of the first object OBJ1 in the first direction DR1 and the second direction DR2 may be concurrently (e.g., simultaneously) detected. In another embodiment, when the number of sensor channels 222 is insufficient, the positions of the first object OBJ1 in the first direction DR1 and the second direction DR2 may be detected during different periods.

During the period t4 to t5, at least some of the sensors TX and/or RX may receive the data signal dat for the uplink signal upl. In an embodiment, in order to reduce a channel configuration cost and power consumption, only the first sensors TX may be connected to the sensor channels 222 to receive the data signal dat. In another embodiment, in order to reduce a channel configuration cost and power consumption, only the second sensors RX may be connected to the sensor channels 222 to receive the data signal dat. In still another embodiment, at least some of the first sensors TX and at least some of the second sensors RX may be connected to the sensor channels 222 to receive the data signal dat.

Referring to FIG. 7, an example configuration of the sensor driver 220 for detecting the position of a second object OBJ2 during the second object sensing period t6 to t7 is shown. Although the embodiment of FIG. 7 employs a mutual-sensing type, a self-sensing type may be employed in another embodiment. The second object OBJ2 may be a passive device that does not transmit and receive electromagnetic signals with the sensor unit 120. For example, the second object OBJ2 may be a user's finger.

The sensor driver 220 may further include a sensor transmitter TDC. During the second object sensing period t6 to t7, the sensor transmitter TDC may be connected to the first sensors TX, and the sensor receiver TSC may be connected to the second sensors RX. During the second object sensing period t6 to t7, the first sensors TX1 to TX4 may sequentially transmit sensing signals, and the second sensors RX1 to RX4 may receive sampling signals corresponding to the sensing signals.

Referring again to FIG. 5, the sensor transmitter TDC may sequentially supply the sensing signals to the first sensors TX1 to TX4. For example, the sensor transmitter TDC may supply the sensing signals to the first sensor TX1 twice (e.g., a rising transition and a falling transition), may supply the sensing signals to the first sensor TX2 twice, may supply the sensing signals to the first sensor TX3 twice, and may supply the sensing signals to the first sensor TX4 twice. The number of times the sensing signals are supplied to each of the first sensors TX1 to TX4 may be more than twice according to an embodiment.

The sensor receiver TSC may include a plurality of sensor channels 222 connected to the plurality of second sensors RX. Each of the sensor channels 222 may receive the sampling signals corresponding to the sensing signals from a corresponding second sensor RX. For example, in response to the rising transition applied to the first sensor TX1, the sensor channels 222 connected to the second sensors RX1 to RX4 may independently receive the sampling signals. In addition, in response to the falling transition applied to the first sensor TX1, the sensor channels 222 connected to the second sensors RX1 to RX4 may independently receive the sampling signals.

At (e.g., in or on) the sensing area SA, mutual capacitances between the first sensors TX1 to TX4 and the second sensors RX1 to RX4 may vary according to the position of the second object OBJ2. Accordingly, the sampling signals received by the sensor channels 222 may be different from each other. The position of the second object OBJ2 may be detected by using the difference between the sampling signals.

Figure 8:
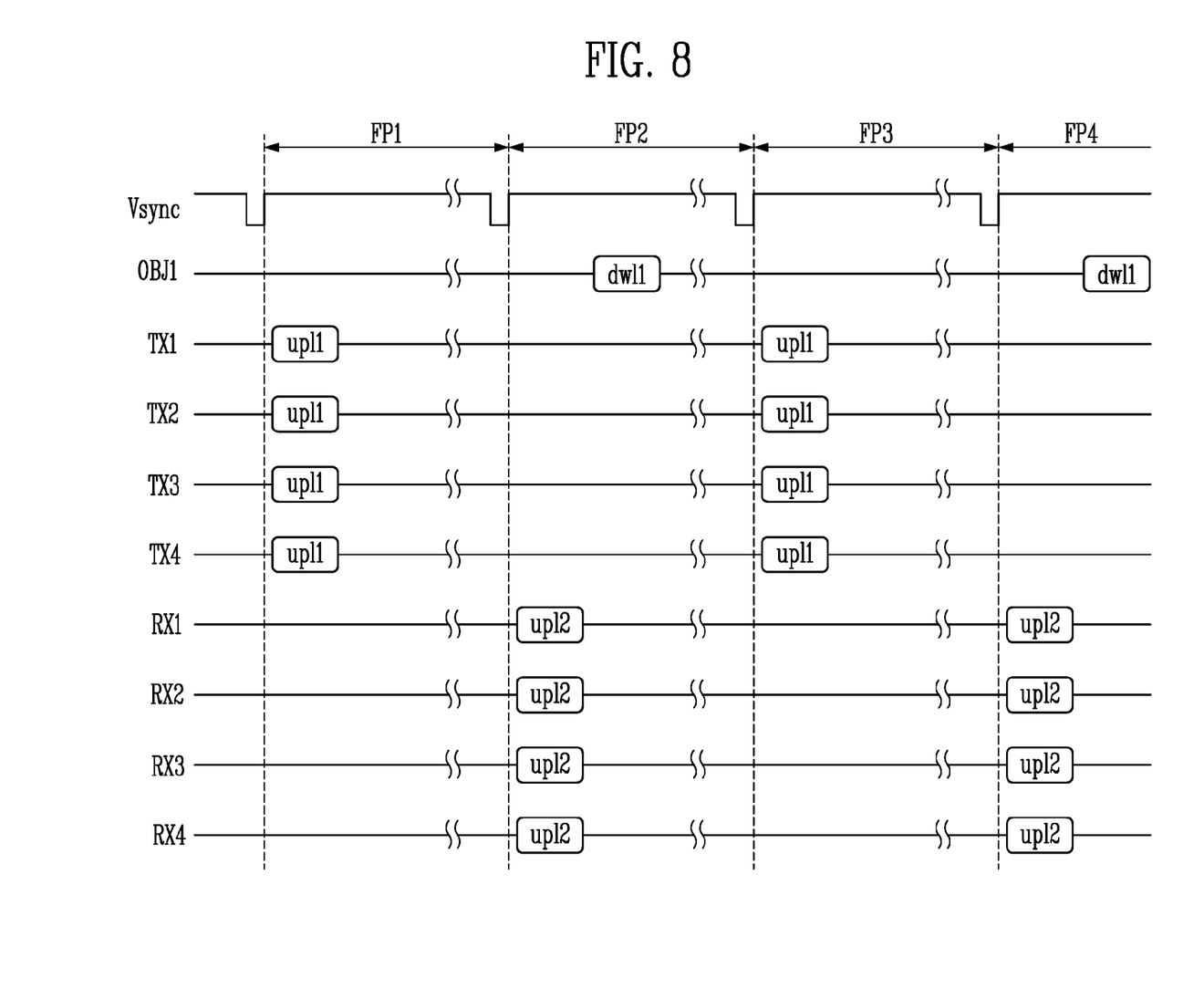
FIG. 8 is a diagram illustrating a driving method of a display device according to an embodiment of the present disclosure.

FIG. 8 is a diagram illustrating a driving method of a display device according to an embodiment of the present disclosure. In the following description with reference to FIG. 8, redundant description as those of the embodiments of FIGS. 1 to 7 described above may not be repeated.

Referring to FIG. 8, four frame periods FP1, FP2, FP3, and FP4 are shown as an example. During a first frame period FP1, the first sensors TX1 to TX4 may transmit an uplink signal upl1, and the second sensors RX1 to RX4 may not transmit the uplink signal. During a first object sensing period of the first frame period FP1, the first sensors TX1 to TX4 may concurrently (e.g., simultaneously) transmit the uplink signal upl1. During a second frame period FP2 after the first frame period FP1, the second sensors RX1 to RX4 may transmit an uplink signal upl2, and the first sensors TX1 to TX4 may not transmit the uplink signal. During the first object sensing period of the second frame period FP2, the second sensors RX1 to RX4 may concurrently (e.g., simultaneously) transmit the uplink signal upl2.

Similarly, during a third frame period FP3 after the second frame period FP2, the first sensors TX1 to TX4 may transmit the uplink signal upl1, and the second sensors RX1 to RX4 may not transmit the uplink signal. During a fourth frame period FP4 after the third frame period FP3, the second sensors RX1 to RX4 may transmit the uplink signal upl2, and the first sensors TX1 to TX4 may not transmit the uplink signal.

In other words, according to the present embodiment, the first sensors TX1 to TX4 and the second sensors RX1 to RX4 may alternately transmit the uplink signals upl1 and upl2 in a unit of a frame period (e.g., a frame period unit). Accordingly, interference caused by the uplink signals upl1 and upl2 in each frame period may be reduced or minimized, and occurrence of the dead zone may be reduced or minimized. Also, power consumption may be reduced.

When receiving the uplink signal upl1 and upl2, the first object OBJ1 may transmit a first downlink signal dwl1 during a corresponding frame period.

However, as shown in FIG. 4, when the tip of the first object OBJ1 stays on the second sensor RX4, or moves in a straight line only on the second sensor RX4, the first object OBJ1 may receive only the uplink signals upl2 of the second frame period FP2 and the fourth frame period FP4. For example, the first object OBJ1 may not receive the uplink signals upl1 of the first frame period FP1 and the third frame period FP3. Accordingly, the first downlink signal dwl1 may be generated only in the second frame period FP2 and the fourth frame period FP4. In other words, a report rate for the sensor unit 120 of the first object OBJ1 may decrease.

Figure 9:
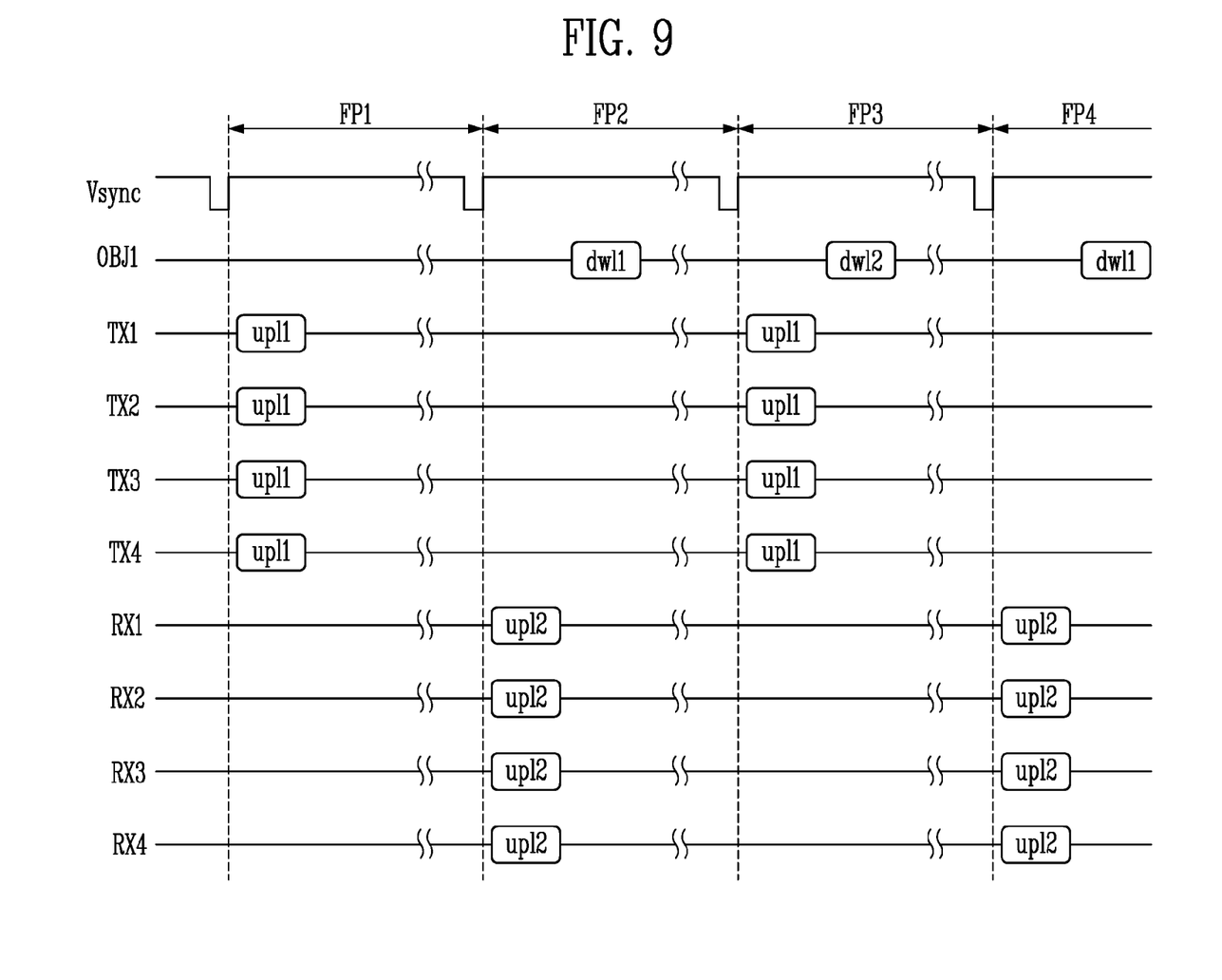
FIG. 9 is a diagram illustrating a driving method of a display device according to another embodiment of the present disclosure.

FIG. 9 is a diagram illustrating a driving method of a display device according to another embodiment of the present disclosure. In the following description with reference to FIG. 9, redundant description as that of the embodiment of FIG. 8 described above may not be repeated.

In the embodiment of FIG. 9, when the first object OBJ1 receives the uplink signal during a corresponding frame period FP2, the first object OBJ1 may transmit a second downlink signal dwl2 during a next frame period FP3. In this case, the first object OBJ1 may transmit the second downlink signal dwl2 even if the uplink signal upl1 is not received during the next frame period FP3.

For example, when the first object OBJ1 is positioned as shown in the case of FIG. 4, the first object OBJ1 may not receive the uplink signal upl1 of the third frame period FP3. However, because the first object OBJ1 has received the uplink signal upl2 in the second frame period FP2, the first object OBJ1 may transmit the second downlink signal dwl2 of the third frame period FP3 based on the uplink signal upl2.

According to the present embodiment, the report rate for the sensor unit 120 of the first object OBJ1 may be maintained or substantially maintained.

Figure 10:
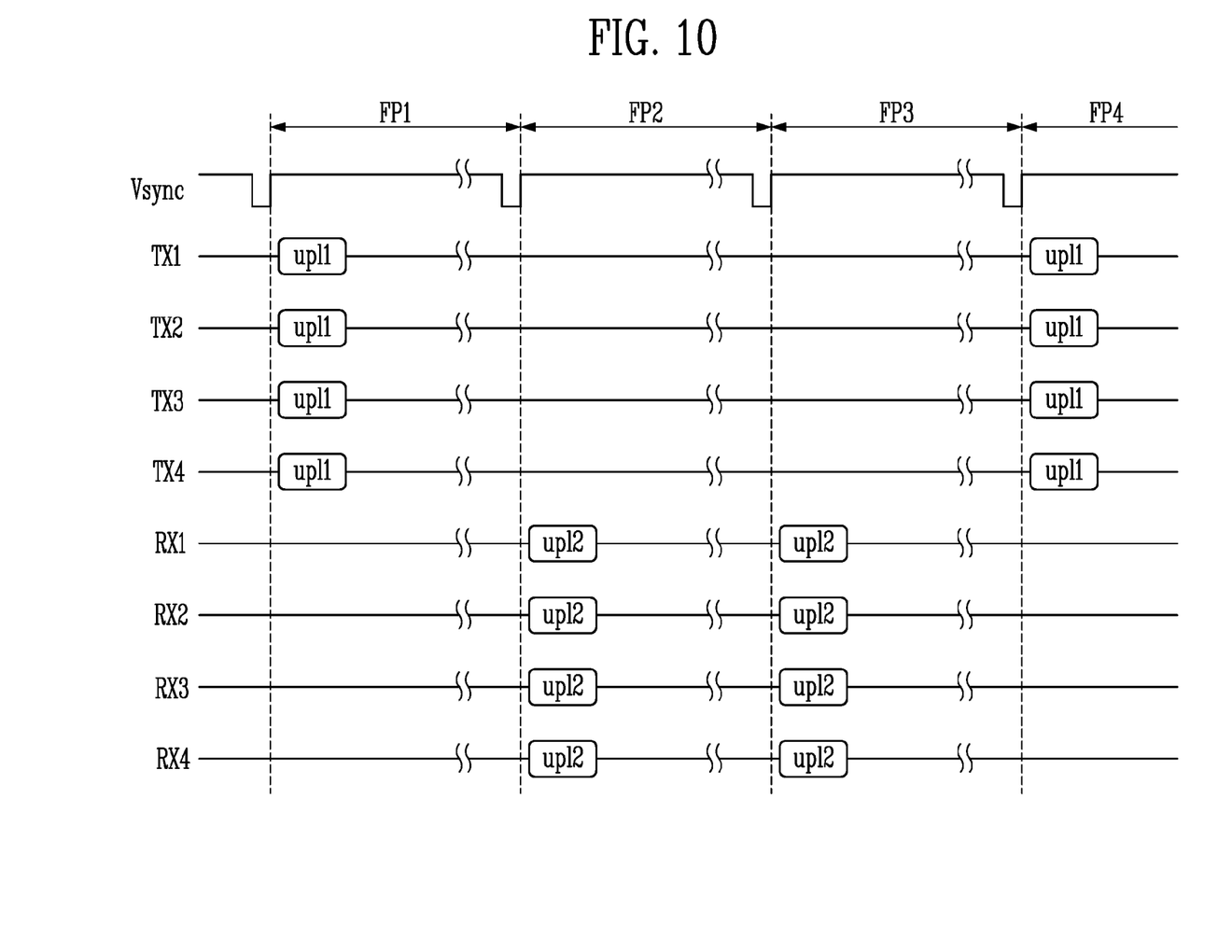
FIG. 10 is a diagram illustrating a driving method of a display device according to another embodiment of the present disclosure.

FIG. 10 is a diagram illustrating a driving method of a display device according to another embodiment of the present disclosure. In the following description with reference to FIG. 10, redundant description as those of the embodiments of FIGS. 8 and 9 described above may not be repeated.

Referring to FIG. 10, the transmission method of the uplink signal in the third frame period FP3 and the fourth frame period FP4 may be different from those of FIGS. 8 and 9. During the third frame period FP3 after the second frame period FP2, the second sensors RX1 to RX4 may transmit the uplink signal upl2, and the first sensors TX1 to TX4 may not transmit the uplink signal upl1. During the fourth frame period FP4 after the third frame period FP3, the first sensors TX1 to TX4 may transmit the uplink signal upl1, and the second sensors RX1 to RX4 may not transmit the uplink signal upl2.

In the embodiments of FIGS. 8 and 9, an uplink transmission ratio of the first sensors TX1 to TX4 and the second sensors RX1 to RX4 is 1:1. However, according to the embodiment of FIG. 10, the uplink transmission ratio of the first sensors TX1 to TX4 and the second sensors RX1 to RX4 may be 1:N, where N is a natural number greater than 1. In another embodiment, the uplink transmission ratio of the first sensors TX1 to TX4 and the second sensors RX1 to RX4 may be N:1. In another embodiment, the uplink transmission ratio of the first sensors TX1 to TX4 and the second sensors RX1 to RX4 may be p:q. Here, p and q may be different positive integers from each other.

The display device and the driving method thereof according to one or more embodiments of the present disclosure may prevent or substantially prevent the deterioration in display quality due to the transmission of the uplink signal.

The drawings referred to heretofore and the detailed description of the present disclosure described above are merely illustrative of example embodiments of the present disclosure. Thus, although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A display device comprising:
   a display unit;
   a sensor unit overlapping with the display unit, and comprising first sensors, and second sensors crossing the first sensors; and
   a first object configured to transmit a first downlink signal during a corresponding frame period in response to receiving an uplink signal,
   wherein during a first frame period, the first sensors are configured to transmit the uplink signal, and the second sensors are configured to not transmit the uplink signal, and
   wherein during a second frame period after the first frame period, the second sensors are configured to transmit the uplink signal, and the first sensors are configured to not transmit the uplink signal.

2. The display device of claim 1, wherein:
   during a first object sensing period of the first frame period, the first sensors are configured to concurrently transmit the uplink signal, and
   during a first object sensing period of the second frame period, the second sensors are configured to concurrently transmit the uplink signal.

3. The display device of claim 2, wherein:
   during a second object sensing period of the first frame period, the first sensors are configured to sequentially transmit sensing signals, and the second sensors are configured to receive sampling signals corresponding to the sensing signals, and
   during a second object sensing period of the second frame period, the first sensors are configured to sequentially transmit the sensing signals, and the second sensors are configured to receive the sampling signals.

4. The display device of claim 1, wherein the first object is configured to transmit a second downlink signal during a next frame period in response to receiving the uplink signal during the corresponding frame period.

5. The display device of claim 4, wherein the first object is configured to transmit the second downlink signal even when the uplink signal is not received during the next frame period.

6. The display device of claim 1, wherein the first downlink signal comprises an acknowledgment signal, a position signal, and a data signal.

7. The display device of claim 6, wherein at least some of the first sensors and at least some of the second sensors are configured to receive the position signal.

8. The display device of claim 1, wherein:
   during a third frame period after the second frame period, the first sensors are configured to transmit the uplink signal, and the second sensors are configured to not transmit the uplink signal, and
   during a fourth frame period after the third frame period, the second sensors are configured to transmit the uplink signal, and the first sensors are configured to not transmit the uplink signal.

9. The display device of claim 1, wherein:
   during a third frame period after the second frame period, the second sensors are configured to transmit the uplink signal, and the first sensors are configured to not transmit the uplink signal, and
   during a fourth frame period after the third frame period, the first sensors are configured to transmit the uplink signal, and the second sensors are configured to not transmit the uplink signal.

10. A driving method of a display device comprising a display unit, and first sensors and second sensors overlapping with the display unit and crossing each other, the method comprising:
    during a first frame period, transmitting an uplink signal by the first sensors, and not transmitting the uplink signal by the second sensors;
    during a second frame period after the first frame period, transmitting the uplink signal by the second sensors, and not transmitting the uplink signal by the first sensors; and
    transmitting a first downlink signal during a corresponding frame period by a first object in response to the first object receiving the uplink signal.

11. The driving method of claim 10, further comprising:
    concurrently transmitting the uplink signal by the first sensors during a first object sensing period of the first frame period, and
    concurrently transmitting the uplink signal by the second sensors during a first object sensing period of the second frame period.

12. The driving method of claim 11, further comprising:
    during a second object sensing period of the first frame period, sequentially transmitting sensing signals by the first sensors, and receiving sampling signals corresponding to the sensing signals by the second sensors; and during a second object sensing period of the second frame period, sequentially transmitting the sensing signals by the first sensors, and receiving the sampling signals by the second sensors.

13. The driving method of claim 10, further comprising: transmitting a second downlink signal during a next frame period by the first object in response to the first object receiving the uplink signal during the corresponding frame period.

14. The driving method of claim 13, wherein the first object transmits the second downlink signal even when the uplink signal is not received during the next frame period.

15. The driving method of claim 10, wherein the first downlink signal comprises an acknowledgment signal, a position signal, and a data signal.

16. The driving method of claim 15, further comprising: receiving the position signal by at least some of the first sensors and at least some of the second sensors.

17. The driving method of claim 10, further comprising:
during a third frame period after the second frame period, transmitting the uplink signal by the first sensors, and not transmitting the uplink signal by the second sensors; and
during a fourth frame period after the third frame period, transmitting the uplink signal by the second sensors, and not transmitting the uplink signal by the first sensors.

18. The driving method of claim 10, further comprising:
during a third frame period after the second frame period, transmitting the uplink signal by the second sensors, and not transmitting the uplink signal by the first sensors; and
during a fourth frame period after the third frame period, transmitting the uplink signal by the first sensors, and not transmitting the uplink signal by the second sensors.

* * * * *